3,088,866
IMPROVING FERTILIZED AVIAN EGGS WITH 3-INDOLEBUTYRIC ACID
Nathan Wernicoff, Vineland, N.J., and Gregory Pincus, Northboro, Mass., assignors to Vineland Poultry Laboratories, Vineland, N.J., a partnership
No Drawing. Filed Sept. 26, 1958, Ser. No. 763,471
8 Claims. (Cl. 167—53.1)

The present application is based on our discovery that when the plant hormone 3-indolebutyric acid is made available to the live animal embryo of a fertilized avian egg it will stimulate the biological life-growing processes during incubation and increase the yield of chicks from a given batch of eggs. But even more surprising than this is the fact that when the plant hormone is made available is the fact that when the plant hormone is made available in optimum amounts it is capable of facilitating the formation of a live embryo in certain of the eggs which although naturally fertilized showed no sign of a living embryo prior to treatment. This effect of the plant hormone for causing live embryos to form further serves to increase the yield of chicks from a given batch of eggs.

The term hormone has many meanings and it is advisable to clarify these before proceeding further. A hormone is defined as a chemical compound produced in certain specialized cells, usually in a ductless gland, which is delivered directly to the blood stream and which exerts a physiological effect upon other cells usually far remote from those of its origin. In other words, hormones are chemical messengers which control and coordinate certain intricate chemical reactions in the living body. The term "hormone" also is by popular usage applied to the active principles controlling plant growth, but this use of the same term does not imply that the plant hormones are in any sense the chemical equivalents of the hormones produced in specialized cells of animals. In accordance with popular usage, the term "plant hormone" is applied in the following specification and claims to 3-indolebutyric acid, but this use of the term does not imply that this substance is the chemical equivalent of animal hormones, such as those having a steroid structure. In fact, there is no structural similarity chemically between 3-indolebutyric acid and the steroids.

In the poultry industry today the farmer looks to commercial hatcheries for new chicks to replenish his flock. In an average size commercial hatchery up to one hundred thousand eggs may be incubated in a year and incubation is very carefully controlled to insure as high a yield of chicks as possible. The yield primarily depends upon the number of fertile eggs with a live embryo and for this reason many commercial hatcheries maintain special flocks and use selective breeding to insure as large a number of hatchable eggs as possible. During the good laying seasons of the year about 80 to 90% of the eggs contain live embryos and with such a high percent of hatchable eggs the total yield of chicks is about 80 to 85%. During the poor laying seasons the number of viable embryos will drop to about 60 to 65% and with this low potential the yield of chicks drops to about 50 to 55% of the total number of eggs incubated. In well run commercial hatcheries an average yield for any one year of about 75% of the total number of incubated eggs is considered excellent.

By treating eggs in accordance with the present invention the average annual yield of chicks in the poor laying seasons in a commercial hatchery may be increased from about 75% to about 85%.

Statistically it would appear impossible for us to achieve our results. We are here dealing with biological life-growing processes and according to statistics it would appear that nature has established a plateau which as a practical matter limits the yield of chicks even when incubation is carried out under the most carefully controlled condition. Repeated experiments have proven that such limit is not inflexible and with eggs treated in accordance with our invention we have been able regularly to achieve yields heretofore considered virtually impossible to obtain in commercial practice.

It may well be that the plant hormone of our invention acts as a strong stimulant to the biological life-growing processes of the animal embryo or on the other hand it may provide an essential ingredient for life not present in a natural egg. But regardless of the exact nature of the way in which the plant hormone acts the fact remains that when the hormone is made available to a live animal embryo the number of chicks that hatch out are increased and when the plant hormone is made available in optimum amounts to the life-giving cells of the blastoderm of the egg it so stimulates the life growing activity that a live embryo is caused to form which before treatment failed to show under the most careful candling. Increasing the number of live embryos is especially important during the poor laying seasons when the number of hatchable eggs is only about 60% of the total. In such case eggs treated with the plant hormone of our invention gave an 80% yield of chicks, representing an increase of at least 20% over that possible to achieve with fertile eggs provided by nature.

In all cases chicks hatched from eggs treated with 3-indolebutyric acid were viable, healthy and vigorous and tended to have greater resistance to disease than ordinary chicks hatched from untreated eggs.

The 3-indolebutyric acid may be used alone or it may be used in combination with one or more other ingredients such as sex hormones, vitamins, minerals, enzymes, antibiotics etc. The particular combination employed will depend upon the situation at hand. For example vitamins may be used in those cases where the eggs are found to be deficient in natural vitamin content or on the other hand antibiotics may be used if a disease should threaten to spread through the flock. Sex hormones may be combined with 3-indolebutyric acid where it may be desirable to produce all cockerels or all hens.

Any of the known methods for causing ingredients to pass through the shell of a whole egg and into the interior may be employed in carrying out our invention. For example the 3-indolebutyric acid may be injected into the egg by means of a hypodermic needle or the acid may be applied as a fine spray to the shell of the egg so that it will thereafter be drawn through the pores of the shell and into the interior of the egg. As is known this may be most conveniently done by merely adding the 3-indolebutyric acid to the humidifier of the incubator. These methods are now well known in the art and it will be understood that the method employed for causing our plant hormone to penetrate into the egg does not constitute any part of the present invention.

In our work we have found it convenient to dip the eggs in a liquid treating medium that contains as an essential ingredient thereof 3-indolebutyric acid. As is now known when a whole shell egg is dipped or otherwise wet with a liquid, the liquid will slowly be drawn through the shell into the egg magma and the liquid will be drawn in more quickly if the temperature of the egg exceeds that of the liquid medium.

The liquid treating medium for dipping the eggs may be readily made up in known manner by simply adding the plant hormone 3-indolebutyric acid to a non-toxic liquid carrier in which the acid is soluble or dispersible. The solubility of 3-indolebutyric acid in organic solvents is known and the data is given in the literature so that those skilled in the art can readily select a suitable solvent. For best results, the non-toxic liquid carrier employed in the treating medium should be one that does not chemically react with the egg magma or with the 3-indolebutyric acid. If reaction does take place it should be one of known characteristics that will not harm the biological life-growing processes of the embryo. If two or more different liquid carriers are employed, they should not react chemically with each other or if they do react the reaction product should be one that will not adversely affect development and hatching of the chicks. Among the non-toxic liquid carriers which have proven useful in carrying out our invention, particularly good results have been achieved with organic alcohols, ethers and fatty oils.

Preferred organic solvents which we have employed with excellent results include ethyl alcohol and isopropyl alcohol. Polyethylene glycols such as diethylene glycol and ethers such as diethyl ether and isopropyl ether also can be used. Oils in which the 3-indolebutyric acid has been dispersed include vegetable oils such as sesame, corn, soybean or cottonseed oil.

These named liquid carriers are known, and have previously been used for carrying vitamins and other ingredients through the shell of a whole egg and into the magma thereof. Other non-toxic liquid carriers may be employed in the liquid treating medium which are known to be effective for dissolving, dispersing or emulsifying the indolebutyric acid. Enough 3-indolebutyric acid is introduced to give a growth-promoting effect, as evidenced by an improved yield of hatched eggs. Very small amounts are sufficient. Only a trace of 3-indolebutyric acid will be introduced from a 0.01 mg./ml. indolebutyric acid solution in the brief time required to dip the eggs for 40 seconds and then store it while wet with solution at an incubation temperature. Yet, this amount will give a marked improvement in the number of eggs hatched. Nor is there any upper limit, save for the limits imposed by economics. Since optimum results are obtained with small amounts, large amounts are wasteful. The amount of 3-indolebutyric acid made available to the egg magma may be changed by changing the concentration of 3-indolebutyric acid in the liquid treating medium. From our work it would appear that a liquid treating medium containing only a trace (0.01 mg. of 3-indolebutyric acid per ml. of liquid) will provide some of the benefits of our invention and the same would apply to a liquid treating medium containing as much as 35 mgs. of 3-indolebutyric acid per ml. of liquid. In commercial practice, however, we have achieved best results by dipping the eggs in a liquid treating medium containing about 0.1 mg. to 25.0 mgs. of 3-indolebutyric acid in each ml. of liquid, and this as we now see it constitutes the range of optimum concentration. It will be understood that the specified range of concentrations applies to liquid treating mediums in which the eggs are dipped. If other methods are employed different concentrations may be used. For example only a small amount of a very highly concentrated liquid may be sprayed on the shell or injected into the egg magma to provide an amount of 3-indolebutyric acid equivalent to that specified for dipping the eggs.

The length of time during which the eggs are held in the liquid medium at optimum concentrations does not seem to affect the results to any appreciable extent and while dipping is preferably carried out immediately prior to incubation if desired the eggs may be dipped after incubation has started as in the known dipping processes where eggs are treated by dipping in vitamins and other liquids up to eight days or more after the first day of incubation.

The following examples are given solely for the purpose of illustrating additional details of the present invention and it will be understood that our invention is not to be limited to the details set forth in the examples. In all of the examples chicken eggs were employed since raising chickens to supply eggs and meat for the table constitutes the most important branch of the poultry industry today.

*Example I*

As shown in the table below three liquid treating mediums were made up by adding 3-indolebutyric acid to isopropyl alcohol and immediately prior to incubation 190 eggs were placed in an open wire tray and submerged in the liquid for about 40 seconds. Thereafter the eggs were removed from the tray and incubated in the usual manner. In the example the control and treated eggs were all selected from the same lot and each run included 190 eggs. In the case of the control the eggs were not treated but were incubated along with the treated eggs.

| Run No. | Concentration 3-indolebutyric acid mgm. per ml. of liquid treating medium | Percent fertile eggs with live embryo | Percent fertile eggs hatched | Percent gain fertile eggs hatched | Percent total eggs hatched | Percent gain total eggs hatched |
|---|---|---|---|---|---|---|
| Control | | 64.0 | 88.7 | | 56.6 | |
| 1 | 0.5 | 85.4 | 94.2 | 5.5 | 80.6 | 24.0 |
| 2 | 2.5 | 65.1 | 92.9 | 4.2 | 60.7 | 4.1 |
| 3 | 25.0 | 70.0 | 88.9 | .2 | 62.2 | 5.6 |

These results show that the 3-indolebutyric acid is most effective at a concentration of 0.5 mgm. for each ml. of liquid treating medium and at this concentration the number of fertile eggs with live embryos was increased by about 21.4% over the control. In all of the examples set forth herein the percent of fertile eggs containing a live embryo was determined by candling the eggs before treatment as well as during incubation and the percentages represent maximum values observed during the entire test period. When the increase over the control of 24% of total eggs that hatched out chicks in Example I is compared to the 21% increase in fertile eggs containing a live embryo, it is apparent that our treatment is not only effective for increasing the number of fertile eggs that are capable of hatching but in addition the treatment effectively stimulates the biological life growing processes by increasing the total number of fertile eggs among the hatchable eggs and this effect is obtained over a wide range of concentrations. Run Numbers 2 and 3 show that at the higher concentration of 3-indolebutyric acid the increase in hatched eggs is due principally to an increase in the number of fertile eggs and not to an increase in the hatchability of fertile eggs. All of the chicks were viable, healthy and vigorous. The health of chicks from treated eggs was in general better than that of the chicks from the untreated eggs of the control.

*Example II*

The following example illustrates the effect of the plant hormone 3-indolebutyric acid on eggs that are laid during the good seasons of the year when the number of fertile eggs with live embryo is high.

| Run No. | Concentration 3-indolebutyric acid mgm. per ml. of liquid treating medium | Percent fertile eggs with live embryo | Percent fertile eggs hatched | Percent gain fertile eggs hatched | Percent total eggs hatched | Percent gain total eggs hatched |
|---|---|---|---|---|---|---|
| Control | | 94.0 | 87.5 | | 82.2 | |
| 1 | 0.5 | 97.6 | 87.5 | 0.0 | 85.2 | 3.3 |

The ingredients and procedure employed in making up the liquid treating medium of Example II and the manner in which the eggs were dipped and the time that they were submerged was exactly the same as described in Example I. The results of Example II show that even during the good laying seasons the 3-indolebutyric acid of our invention is effective for increasing the percent of fertile eggs that are capable of hatching out chicks, and the total yield of chicks was increased by 3.3%. The chicks hatched from the treated eggs were viable, healthy and vigorous.

*Example III*

| Run No. | Concentration 3-indolebutyric acid and riboflavin mgm. per ml. of liquid treating medium | Percent fertile eggs with live embryo | Percent fertile eggs hatched | Percent gain fertile eggs hatched | Percent total eggs hatched | Percent gain total eggs hatched |
|---|---|---|---|---|---|---|
| Control | | 89.7 | 79.9 | | 71.7 | |
| 1 | Riboflavin 5.0; 3-indolebutyric acid 0.5. | 92.7 | 81.7 | 1.8 | 75.7 | 4.0 |
| 2 | Riboflavin 1.0; 3-indolebutyric acid 0.5. | 92.6 | 85.9 | 6.0 | 79.6 | 7.9 |

This example illustrates the use of the 3-indolebutyric acid of our invention in combination with the $B_2$ vitamin riboflavin. It will be seen from examination of the data that the percent of fertile eggs with live embryo was increased and that the biological life-growing processes were stimulated to give an increase in the yield of chicks.

In Example III the liquid carrier and procedure described in Example I were employed and the eggs were dipped and held submerged in the liquid treating medium as specified in Example I.

*Example IV*

| Run No. | Concentration 3-indolebutyric acid and aureomycin mgm. per ml. of liquid treating medium | Percent fertile eggs with live embryo | Percent fertile eggs hatched | Percent gain fertile eggs hatched | Percent total eggs hatched | Percent gain total eggs hatched |
|---|---|---|---|---|---|---|
| 1 | Aureomycin 2.5 | 92.0 | 83.1 | | 76.6 | |
| 2 | Aureomycin 2.5; 3-indolebutyric acid 0.5. | 98.0 | 83.9 | 0.8 | 82.1 | 5.5 |

This example illustrates the use of the 3-indolebutyric acid of our invention in combination with the antibiotic auremycin. As in the case of Example III the combination effectively increased the percent of fertile eggs with live embryo and at the same time it stimulated the life growing processes.

Apparently the 3-indolebutyric acid of our invention has very special characteristics that make it effective, and not every plant hormone will work. For example we have found the plant hormone 3-indoleacetic acid to be ineffective for achieving the beneficial results of the 3-indolebutyric acid of our invention. The results of our work with 3-indoleacetic acid is shown in the example below:

*Example V*

| Run No. | Concentration 3-indoleacetic acid mgm. per ml. of liquid treating medium | Percent fertile eggs with live embryo | Percent fertile eggs hatched | Percent loss fertile eggs hatched | Percent total eggs hatched | Percent loss total eggs hatched |
|---|---|---|---|---|---|---|
| Control | | 93.8 | 89.4 | | 84.4 | |
| 1 | 0.5 | 91.9 | 85.2 | 4.2 | 78.3 | 6.1 |
| 2 | 2.5 | 89.6 | 86.0 | 3.4 | 77.1 | 7.3 |
| 3 | 25.0 | 85.2 | 85.3 | 4.1 | 75.0 | 9.4 |

In this example the same procedure as specified in Example I was employed. Examination of the data shows that far from having any beneficial effect, the 3-indoleacetic acid in fact inhibits the life-growing processes of the embryo of the egg.

It will be understood that it is intended to cover all changes and modifications of the preferred form of invention herein chosen for the purpose of illustration which do not constitute a departure from the spirit and scope of the invention.

What is claimed is:

1. The method of treating fertilized avian eggs, while intact within the shell, to stimulate the biological life growing processes during incubation which comprises the step of providing the live animal embryo within the interior of such eggs with a supply of 3-indolebutyric acid.

2. The method of treating fertilized avian eggs, while intact within the shell, to increase the hatch thereof beyond the maximum hatch obtainable under conventional conditions of laying and incubation which comprises introducing into the interior of such fertilized avian eggs a liquid treating medium which includes as an essential ingredient thereof 3-indolebutyric acid and then incubating the eggs.

3. The method specified in claim 2 which includes the step of dipping the eggs into the liquid treating medium to effect the introduction thereof.

4. The method specified in claim 2 which includes the step of maintaining the liquid treating medium at a temperature below that of the egg at the time of introduction thereof.

5. The method of treating fertilized avian eggs, while intact within the shell, to increase the hatch thereof beyond the maximum hatch obtainable under conventional conditions of laying and incubation which comprises the steps of forming a liquid treating medium which includes as an essential ingredient thereof 3-indolebutyric acid in the proportion of about 0.01 to about 35.0 mgms. for each ml. of liquid treating medium, providing the interior of such fertilized avian eggs with a supply of such liquid treating medium and thereafter subjecting the treated eggs to incubation.

6. The method specified in claim 5 in which the liquid treating medium is formed with isopropyl alcohol.

7. The method specified in claim 5 in which the liquid treating medium includes the $B_2$ vitamin riboflavin in combination with the 3-indolebutyric acid.

8. A fertilized avian egg treated in accordance with the process specified in claim 2.

References Cited in the file of this patent

UNITED STATES PATENTS

| 1,516,012 | Hinrichs | Nov. 18, 1924 |
| 2,734,482 | Seltzer | Feb. 14, 1956 |
| 2,851,006 | Taylor | Sept. 9, 1958 |
| 2,913,340 | Chornock et al. | Nov. 17, 1959 |
| 2,925,341 | Kaemmerer | Feb. 16, 1960 |
| 2,943,938 | De Zeeuw et al. | July 5, 1960 |

OTHER REFERENCES

Chem. Abst., vol. 35 (1941), 3336[2].

Copenhaver et al.: "Developmental Behaviour of Amblystoma Eggs Subjected to Solutions of Indolebutyric Acid," Anat. Record, vol. 79, pp. 247–261 (1941).

Chem. Abst., vol. 41 (1947), page 1275b.

Chem. Abst., vol. 46 (1952), page 6200b.

"The Chick Embryo in Biological Research," Annals N.Y. Acad. of Sciences, vol. 55, art. 2, pp. 37–344, N.Y., August 8, 1952, citing Cottral, "Endogenous Viruses in the Egg," id. pp. 221–235; citing Buddingh, "Bacterial and Mycotic Infections of the Chick Embryo," id., pp. 282–287.

Chem. Abst., vol. 48 (1954), page 279b.